May 7, 1963     B. WEIGLE     3,088,771
AUTOMOBILE SEAT LITTER RECEIVING DEVICE
Filed Oct. 12, 1961
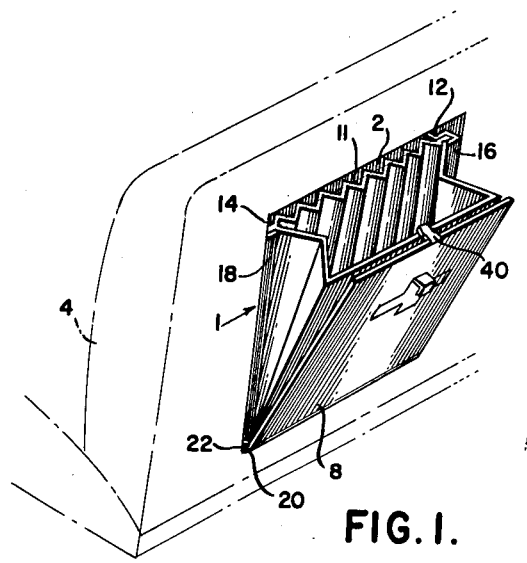
FIG. 1.
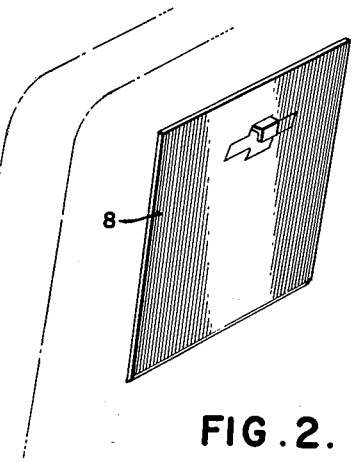
FIG. 2.
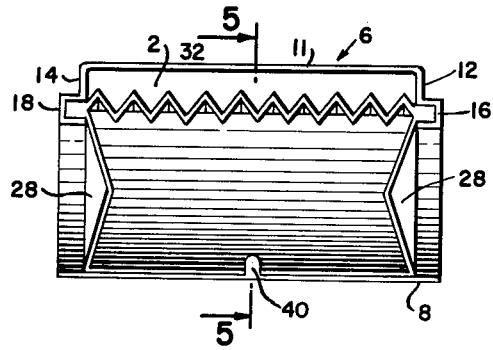
FIG. 3.
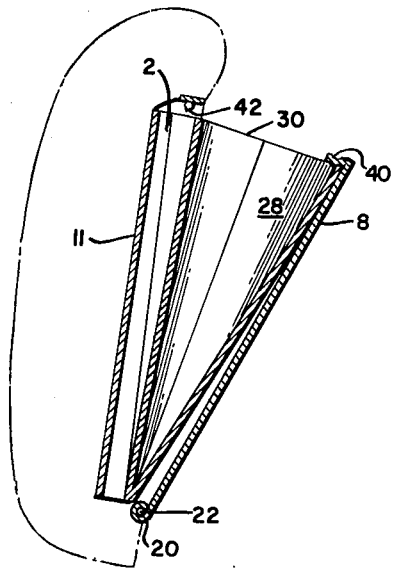
FIG. 4.
FIG. 5.
INVENTOR
Barbara Weigle
BY *Clive H. Bramson*
ATTORNEY United States Patent Office 3,088,771
Patented May 7, 1963

3,088,771
AUTOMOBILE SEAT LITTER RECEIVING DEVICE
Barbara Weigle, 149—19 15th Drive, Whitestone, N.Y.
Filed Oct. 12, 1961, Ser. No. 144,702
2 Claims. (Cl. 296—37)

The present invention relates to a novel and useful trash receptacle for automobiles and more particularly to the combination of a removable insert and a housing therefor adapted to be received within a recess provided within the rear of an automobile seat.

With the object of curtailing the unfortunate tendency of people to discard unwanted litter from automobiles to the roads and highways, the device according to the instant invention is incorporated within automobiles and is provided therewith as standard equipment.

Other objects and advantages of the invention will be set forth in part hereinafter and in part will be obvious herefrom, or may be learned by practice of the invention, the same being realised and attained by means of the instrumentalities and combinations pointed out in the appended claims.

The invention consists in the novel parts, constructions, arrangements, combinations and improvements herein shown and described.

The accompanying drawings referred to herein and constituting a part hereof, illustrate one embodiment of the invention, and together with the description, serve to explain the principles of the invention.

FIG. 1 is a perspective view of the present invention installed and in operative litter-receiving position within the rear surface of the back-supporting member of a conventional automobile seat;

FIG. 2 is a perspective view as shown in FIG. 1 wherein the front-plate of the housing structure is shown in closed position flush with the rear surface of the back-supporting member of the automobile seat;

FIG. 3 is an isolated plan view of the automobile seat litter receiving device;

FIG. 4 is a perspective view of the insert member removed from the housing structure; and, FIG. 5 is a side elevation cross-section view of the present device taken along line 5—5 of FIG. 3, an outline of the back-supporting member of automobile seat being illustrated therein.

An object of the invention is to provide novel means whereby a litter receiving device can be conveniently embodied in conventional automobile construction, there being little modification necessitated thereby.

Another object of the instant invention is the provision of novel litter receiving means in an automobile, said means being available when required and readily retirable from view upon termination of the need.

A further object of the present invention is to provide a device which does not occupy otherwise utilizable space, within an automobile and which is conveniently located to serve as a ready receptacle for litter.

A still further object of the invention is the provision of an automobile litter receiving device having a flexible insert therein which is removably adapted for facilitating emptying thereof.

Another object of the invention is to provide a litter receiving device having a receptacle able to expand to accommodate a substantial volume of litter.

Still another object of the present invention is the provision of a litter receiving device having a removably secured insert adapted to open and close pursuant to the movement of a pivotally mounted front-plate which defines the closure of the device.

Another object of the invention is to provide an improved automobile little receiving device comprised of a removable insert which may be disposed of or emptied at the end of a journey and readily replaced.

It will be understood that the foregoing general objectives and the following detailed description as well are exemplary and explanatory but are not restrictive of the invention.

A general understanding of the arrangement and location of the parts of the novel device as shown in FIGURE 1 discloses the cooperation of the elements of the operative assembly of the litter receiver designated generally by numeral 1, said assembly being positioned within a recess 2 provided within the back-support member 4 of an automobile seat.

Generally desgnated fack-frame 6, recessedly secured within the rear of an automobile seat as shown, cooperates with front-plate 8 to provide a housing adapted to removably receive insert member 10, illustrated generally in FIGURE 4 of the drawings.

Referring to FIGURE 3 it will be seen that the said back-frame 6 is comprised of back wall 11, a pair of side walls 12, 14, vertical channels 16, 18 being formed within each of said side walls respectively, said channels being disposed in mutually opposed relation, and a pair of ears 20 projecting from each of said side walls, said ears being adapted to journal the said front-plate along the bottom edge thereof at pins 22 for pivotal movement with respect to the said back-frame 6. It will be understood that the pivoted or hinged relation between the back-frame and the front-plate may be varied to employ any suitably operative arrangement, there being no intention to limit this structural detail to the construction shown in the drawings.

Removable insert member 10, in perspective and in isolation, is illustrated in FIGURE 4. Being substantially of highly flexible material, e.g., rubber, synthetic and natural textiles, plastics such as polyvinyls, polyethylenes, etc., insert 10 is comprised of an integrally united back portion 24, having a top edge 32 and a bottom edge 34, a front portion 26, and foldable side walls 28, 30, the said front portion 26 being resiliently united along the said bottom edge 34 of the said back portion. The said back portion 24, being corrugated as shown, provides for substantial flexibility and expansion to thus enable the accommodation of greater than expected volumes of litter under pressures exerted through said litter to the said back portion upon manual closure of the said front-plate 8. It will be further appreciated that the aforesaid corrugation feature facilitates the positioning and removal of the said insert within the back-frame 6 and provides lateral bias thereby assuring retention of the insert within the said back-frame. To these ends, rigidly extending side edges 36, 38 project, as shown, sidewise beyond the width of the insert as defined by the lateral dimension of front portion 26. Vertical corrugations comprising back portion 24 are arranged to be under slight compression when said side edges 36, 38 are received within said vertical channels 16, 18 as shown in FIGURES 1, 3 and 5. Accordingly, the lateral "give" occasioned by the embodiment of vertical corrugations in the said back portion, precludes difficulty in placing and removing the insert to and from its operating position. The adjacency of vertical channels 16, 18 with respect to the rear surface of the automobile seat further facilitates the operation of inserting said side edges 36, 38 therein. To enable this facility and still afford the substantial capacity of insert 10, corrugated back portion 24 expands into recess 2 as additional volume is required. It will be further observed that the compression status of the positioned corrugated back portion results in the obviation of otherwise undesirable "play" within the said vertical channels.

Clasp 40, positioned centrally of the top edge of front-plate 8, is provided to retain said front-plate in closed position by forming a shallow socket connection with dog 42 suitably located within the recess 2 of the rear surface of the automobile seat as shown in FIGURE 5 of the drawings. It will be understood that any suitable means for retaining said front-plate in said closed position is within the contemplation of this invention. It will be further seen that clasp 40 functions to retain front-portion 26 contiguous with front-plate 8 to thus enhance the simplicity of the device.

Although the preferred embodiment of the device has been described, it will be understood that within the purview of this invention various changes may be made in the forms, details, proportion and arrangement of parts, the combination thereof and mode of operation, which generally stated consist in a device capable of carrying out the objects set forth, as disclosed and defined in the appended claims.

What is claimed is:

1. An automobile seat litter receiving device comprised of a housing structure including a back-frame recessedly secured within a recess within the rear of said automobile seat, a front-plate, and an open-topped insert member removably receivable within said housing structure; said back frame including a back wall having top and bottom edges, a pair of side walls, a vertical channel formed within each of said side walls, said channels being disposed in mutually opposed relation, the said front-plate having a top and a bottom edge, the said bottom edge of the said front-plate being pivotally connected along the said bottom edge of the said back-frame, said front-plate being arranged to swing to a closed position flush with respect to the rear surface of the said automobile seat, means to retain said front-plate in closed position, an insert member removably receivable within said housing structure, said insert member being substantially of flexible material providing an integrally united back portion, front portion and foldable side walls, said back portion having a vertically corrugated expandable back wall, a top edge, a bottom edge, and a pair of rigidly extending side edges, said front portion being resiliently united along the said bottom edge of the said back portion, each of the said rigidly extending side edges of said insert member being slidably receivable within a respective one of said vertical channels, the said retaining means being adapted to retain the said front portion contiguously with respect to the said front-plate.

2. An automobile seat litter receiving device according to claim 1 wherein the said means to retain said front-plate in closed position is comprised of the combination of a clasp positioned centrally of the top edge of the said front-plate and a dog located within the said recess within the rear surface of the automobile seat.

References Cited in the file of this patent
UNITED STATES PATENTS

| | | |
|---|---|---|
| 1,243,958 | McFarland | Oct. 23, 1917 |
| 1,527,056 | Martin | Feb. 17, 1925 |